United States Patent [19]
Fujiki et al.

[11] Patent Number: 5,526,128
[45] Date of Patent: Jun. 11, 1996

[54] IMAGE PRODUCING APPARATUS WITH MEMORY UNIT HAVING AN IMAGE MEMORY AREA OF CHANGEABLE STORAGE CAPACITY

[75] Inventors: Hideshi Fujiki, Kasuga; Tadayuki Kajiwara, Fukuoka-ken; Takumi Shimokawa, Tosu; Takanobu Kajikawa, Fukuoka; Toshiyuki Kihara, Munakata; Toshihiko Mitsuse, Kurume, all of Japan

[73] Assignee: Matsushita Electric Industrial Co., Ltd., Osaka, Japan

[21] Appl. No.: 371,612

[22] Filed: Jan. 12, 1995

Related U.S. Application Data

[63] Continuation of Ser. No. 135,185, Oct. 12, 1993, abandoned, which is a continuation of Ser. No. 832,616, Feb. 12, 1992, abandoned, which is a continuation of Ser. No. 537,804, Jun. 14, 1990, abandoned.

[30] Foreign Application Priority Data

Jun. 19, 1989 [JP] Japan .................... 1-156491
Jun. 19, 1989 [JP] Japan .................... 1-156492
Jun. 19, 1989 [JP] Japan .................... 1-156493
Jun. 19, 1989 [JP] Japan .................... 1-156494

[51] Int. Cl.[6] .............................. H04N 1/00; G06K 13/00
[52] U.S. Cl. .......................... 358/444; 395/135; 395/482
[58] Field of Search ............................ 358/404, 409, 358/444; 395/135, 425, 438, 474, 482, 486; 345/113, 114, 189, 190, 200; 364/243.3, 245, 245.1, 245.31, 955, 961.1, 961.2, 964.1, 967.4, 970.3; H04N 1/21

[56] References Cited

U.S. PATENT DOCUMENTS

| | | | |
|---|---|---|---|
| 4,190,835 | 2/1980 | Buynak | 340/750 |
| 4,428,065 | 1/1984 | Duvall et al. | 364/900 |
| 4,591,997 | 5/1986 | Grabel | 364/519 |
| 4,641,255 | 2/1987 | Hohmann | 364/522 |
| 4,689,616 | 8/1987 | Goude et al. | 340/725 |
| 4,924,410 | 5/1990 | Hamada | 364/518 |
| 5,053,761 | 10/1991 | Webster, III | 340/726 |
| 5,105,284 | 4/1992 | Sakata et al. | 358/404 |
| 5,148,293 | 9/1992 | Miyachi | 358/444 |
| 5,150,458 | 9/1992 | Masuzaki et al. | 395/135 |
| 5,276,903 | 1/1994 | Shinagawa | 395/800 |

FOREIGN PATENT DOCUMENTS

| | | | |
|---|---|---|---|
| 55-47769 | 4/1980 | Japan | 358/404 |
| 60-93877 | 5/1985 | Japan | 358/404 |
| 1-142807 | 6/1989 | Japan | 395/135 |

OTHER PUBLICATIONS

"Image Processing System," *IBM Technical Disclosure Bulletin*, vol. 28, No. 3, Aug., 1985, pp. 958–959.

Primary Examiner—Leo Boudreau
Assistant Examiner—Andrew W. Johns
Attorney, Agent, or Firm—Watson Cole Stevens Davis

[57] ABSTRACT

An image data producing apparatus for bit-developing processed image data includes a system processing memory and an variable capacity image data memory for storing bit-developed image data; control means is also included for changing the storage capacity of the image data memory.

11 Claims, 9 Drawing Sheets

IMAGE PRODUCING APPARATUS WITH MEMORY UNIT HAVING AN IMAGE MEMORY AREA OF CHANGEABLE STORAGE CAPACITY

This application is a continuation of application Ser. No. 08/135,185, filed Oct. 12, 1993 (abandoned), which is a continuation of Ser. No. 07/832,616, filed Feb. 12, 1992 (abandoned), which is a continuation of Ser. No. 07/537,804, filed Jun. 14, 1990 (abandoned).

BACKGROUND OF THE INVENTION

1. Field of the Invention

The present invention relates to an image producing apparatus having an image memory which is to develop and output bit map data.

2. Description of the Related Art

A conventional image producing apparatus will be described by making reference to an example of a laser printer which is a generally used one of image producing apparatuses. FIG. 7 is a block diagram of a conventional laser printer. As shown there, the laser printer is constructed with five blocks including: interface means 2; video data processing means 3; a laser scan unit section 4 (hereinafter abbreviated as an LSU section); engine control means 5; and an engine mechanical section 6.

The outline of the laser printer having the above construction will be described hereinbelow. The laser printer connected with a host computer 1 receives text data sent from the host computer 1 through the interface means 2 and stores it in the memory in the video data processing means 3. Then, the text data is developed in the form of a bit map data used as an image data in the video data processing means 3, and the resultant data is sent to the LSU section as a serial output video data (hereinafter, abbreviated as VDOUT) is synchronism with a horizontal sync signal (hereinafter, abbreviated as HSYNC) supplied from the LSU section 4 operating as an output apparatus. At the same time, along with the outputting of the VDOUT, the video data processing means 3 manages an engine control means 5 for controlling the operations of an engine mechanical section 6 including paper feed, main motor drive, and the like. As mentioned above, the image formation of image data is effected.

With respect to the laser printer constructed as mentioned above, FIG. 8 is a block diagram of a video data processing section showing a conventional construction of the video data processing means 3. In the diagram, reference numeral 7 denotes an MPU; 8 indicates a DRAM block section having a DRAM; and 9 represents a VRAM block section. Reference numeral 10 denotes address decoding means which uses an address bus (MPUA) of the MPU 7 as an input thereto, performs decoding of addresses, and discriminates to which one of the memories of the DRAM block section 8 and the VRAM block section 9 the MPU 7 requests its access. Then, the address decoding means 10 generates and supplies an access request signal (DRAMRQ) for requesting an access to the DRAM block section 8 to DRAM arbitration means 12, which will be explained later, or an access request signal (VRAMRQ) for requesting an access to the VRAM block section 9 to VRAM arbitration means 16, which will also be explained later. Reference numerals 11 and 15 denote refreshing means for the DRAM block section 8 and the VRAM block section 9, respectively, and they are means for requesting the refreshment of the DRAM block section 8 and the VRAM block section 9, respectively. The refreshing means 11 generates and supplies a refresh request signal (DREFRQ) to the DRAM arbitration means 12, and the refreshing means 15 generates and supplies a refresh request signal (VREFRQ) to the VRAM arbitration means 16. Reference numerals 12 and 16 denote respective arbitration means for the DRAM block section 8 and the VRAM block section 9, respectively. The DRAM arbitration means 12 arbitrates the access request signal DRAMRQ and the refresh request signal DREFRQ and outputs a DRAM start command signal group (DSTCOM), that indicates a state showing which arbitration has resulted, to DRAM timing means 13 which will be explained later. The VRAM arbitration means 16 arbitrates the access request signal VRAMRQ and the refresh request signal VREFRQ and outputs a VRAM start command signal group (VSTCOM), that indicates a state showing which arbitration has resulted, to VRAM timing means 17 which will be explained later. Reference numeral 14 indicates bank switching means which inputs the address bus MPUA and sends a bank switching state signal group (BANKST) to the DRAM timing means 13, which will be explained later.

Since the user's area for storing the text data in the DRAM block section 8 is fixed and limited, it is necessary to expand the memory capacity in accordance with an amount of user's text data in order to prevent occurrence of memory overflow. Thus bank switching is executed when the memory of the DRAM block section 8 is expanded. Reference numeral 13 denotes DRAM timing means which generates a timing signal group (DRAMT) for making DRAM access to the DRAM block section 8 by the signal group DSTCOM, which are sent from the DRAM arbitration means 12, and, at the same time, which receives the signal group BANKST sent from the bank switching means 14 and supplies a bank information signal (BANK0) to the DRAM block section 8. Although FIG. 8 does not show this, it is assumed that there are provided expansion DRAM block sections for bank information signals BANK1 and BANK2 in the same way as the DRAM block section 8 for the bank information signal BANK0. As mentioned above, the address bus MPUA, the bank information signal BANK0, the timing signal group DRAMT, and a data bus MPUD are connected with the DRAM block section 8, thereby enabling access of the MPU 7 to the DRAM. Reference numeral 17 denotes the VRAM timing means for receiving the signal group VSTCOM sent from the VRAM arbitration means 16 and for sending a timing signal group (VRAMT) for the VRAM access to the VRAM block section 9. The VRAM block section 9 is connected to the address bus MPUA and the data bus MPUD and receives the timing signal group (VRAMT) and sends the video data, which is a serial output, to video signal synchronizing means 18, which will be explained later, in accordance with clocks which are sent from the video signal synchronizing means 18 via video data bus (VDB). As mentioned above, the video data bus VDB is constructed by the clock line and the serial data line. Since the capacity of the memory buffer of the VRAM block section 9 is generally limited, there occurs a state of error (hereinafter, such a state of error is referred to as an overrun) in which the data, which has not yet been subjected to image data development, is transferred, when the sequential reading speed of the sync signal HSYNC is faster than the developing speed of the image data into the memory buffer. In order to expand the overrun-free range, it is necessary to increase the capacity of the memory buffer in the VRAM block section 9. Reference numeral 18 denotes the video signal synchronizing means for counting the blanking time and generating clocks for the VRAM block section 9 so as to output the video data sent from the VRAM block section 9 to an effective printing area in synchronism with a sync signal HSYNC sent from the LSU section 4 (not shown), and sending the generated clocks as a serial video data output VDOUT to the LSU. On the other hand, the MPU 7 detects the sync signal HSYNC and counts the number of rasters of the output data, and also performs the control and management of the VRAM block section 9 and the video signal synchronizing means 18.

As mentioned above, the memories are separated to be independent of each other so that the system and the user's area are assigned to the DRAM block section 8 and the image data is developed in the VRAM block section 9. Since the VRAM block section 9 is constructed to have dual ports, the access by the MPU 7 and the access by the clocks from the video signal synchronizing means 18 can be easily performed.

On the contrary, there have been inconveniences such that expansion boards for expanding the memory area are independently needed for the DRAM block section 8 and the VRAM block section 9. The utilization facility of such a construction has been degraded for the user. In this art field, a high resolution display using bit-mapped data is known as a bit map display system. In the conventional bit map display system, each picture element (pixel) corresponds to data bits stored in a memory; usually, data to be displayed is stored in a predetermined memory area (termed a frame buffer) of the memory in the form of a directly displayable pattern. This display pattern is termed a "bit map". Hereinafter, the term "bit-developing" will be used in conjunction with the improved and novel image processing system of the present invention.

FIG. 9 shows characters which have been developed as bit map data to form image data of an image. For instance, an explanation will be made of the development of characters A and B. For convenience of explanation, it is assumed that each character is constructed by 25×25 dots, one dot is in one bit unit, one dot painted in black corresponds to 1, and one blank dot to 0. Each bit information of 25×25 dots is stored in a character font using a code of 1 or 0. The text data stored in the DRAM is developed as bit map data in the buffer of the VRAM by making reference to the character font via the MPU. Generally, in the above development, characters are sequentially developed one by one and written in the buffer. In FIG. 9, the character "A" is first developed as a bit map in the buffer of the VRAM, and each bit is written in accordance with the code of the character font. Then, the bit map development of the character "B" is made. In the case where the characters "A" and "B" are overlaid, if the ordinary writing operation is performed, the 25×25 bits are written by the information of the character "B" at the time point when the writing operation of the character "B" is performed, so that the character "A" is partially erased. To prevent it, after the character "A" has been developed, the OR operation of the characters "A" and "B" is performed on a bit unit basis so that the overlaid information is written in the buffer, whereby an overlaid character as shown in FIG. 9 can be written. Such a function is hereinafter referred to as an overlaid-writing. Generally, the VRAM has the overlaid-writing function, and it is assumed that the VRAM, which is referred to hereinlater, has such a function.

The control which is executed by the MPU 7 in FIG. 8 will now be described by using a flowchart of FIG. 10. With respect to the HSYNC interruption routine, an interruption occurs in the processing of the MPU 7 each time a pulse is applied to the HSYNC input in FIG. 8. An explanation will be made hereinbelow with reference to the flowchart. First, in the main routine, variables X and Y are initialized in step (a). X denotes a raster number which is written in the VRAM area by the MPU 7. Y indicates a counter number indicative of the number of interruption times for every HSYNC. A raster number N to be printed is set in step (b). The HSYNC interruption is permitted in step (c). In step (d), a blanking time and the like are set into the video signal synchronizing means 18 and the means 18 is activated. In step (e), the magnitudes of X and Y are compared with each other to discriminate whether there exists or not an empty raster by which the bit map data can be written in the VRAM block section 9. If no empty raster exists, the processing routine is returned to the entrance of step (e). If an empty raster exists, the processing proceeds to step (f). In step (f), the bit map data is written in the VRAM block section 9 to the amount of one raster and +1 is added to the value of X. In step (g), a check is made to see if the HSYNC counter number Y is equal or not to the raster number N to be printed. If Y=N, the processing proceeds to step (h). In step (h), the video signal synchronizing means 18 is stopped and the writing of the bit map data in the VRAM block section 9 is completed. Then, in the HSYNC interruption routine, +1 is added to the value of the output raster number Y in step (i). In step (j), Y and N are compared with each other to discriminate whether the printing has been completed or not. If Y=N, the processing proceeds to step (k). If Y≠N, the processing is completed. In step (k), the interruption of HSYNC is inhibited.

SUMMARY OF THE INVENTION

To solve the above-described problem, the invention comprises: memory means having a system memory area and an image memory area; and control means for changing the image memory area of the memory means.

With the above-mentioned construction, the system memory area and the image memory area are arranged in the memory means and the memory means is commonly used while changing the capacity of the image memory area.

DESCRIPTION OF THE PREFERRED EMBODIMENTS

An image producing apparatus of an embodiment of the present invention will be described hereinbelow.

Figure 1:
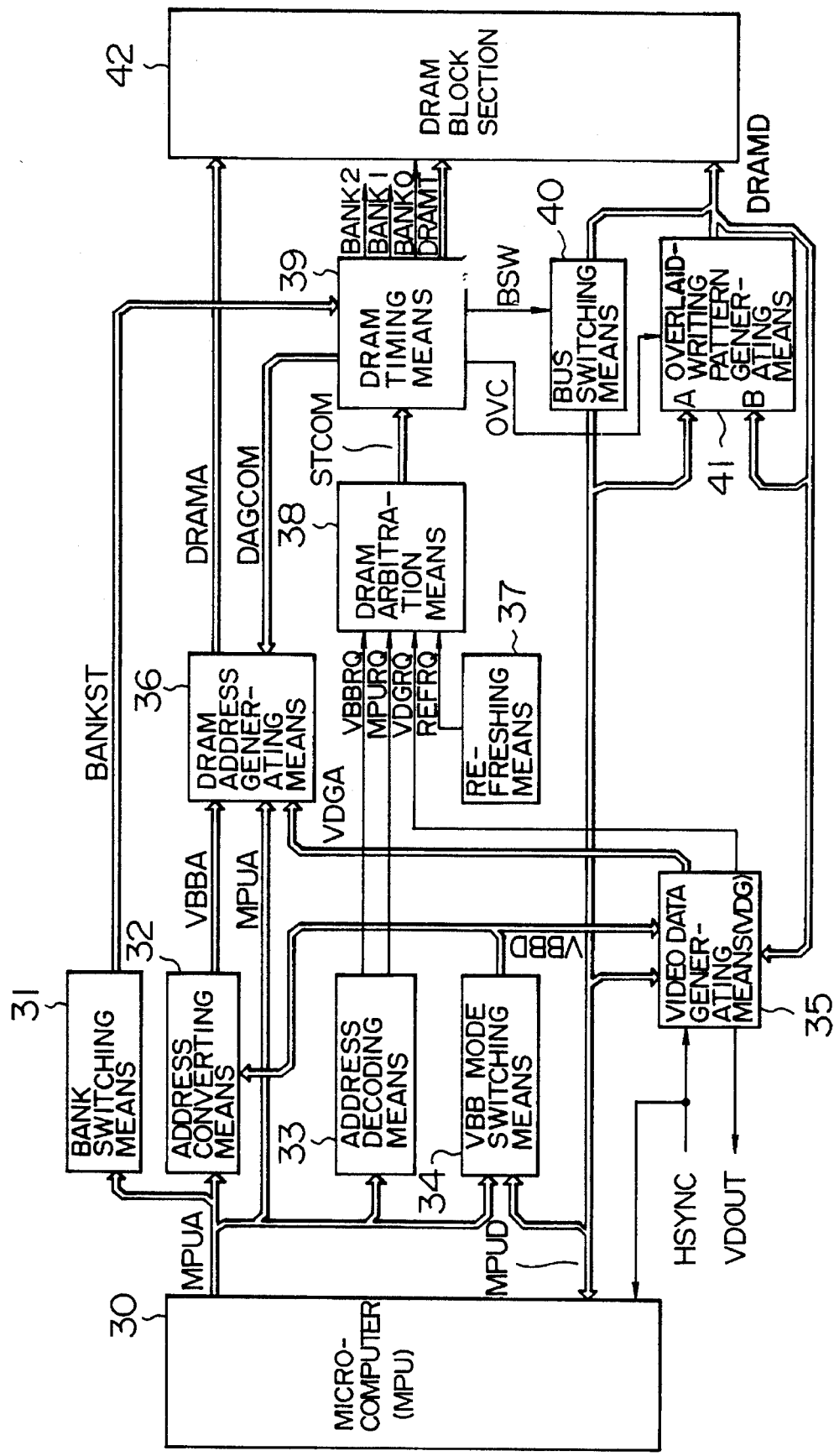
FIG. 1 is a block structure diagram showing a video data processing section of an embodiment of the present invention.

First, FIG. 1 is a block diagram showing a construction of the video data processing section of the image producing apparatus of the embodiment of the present invention. Reference numeral 30 denotes a microprocessor unit (hereinafter, referred to as an MPU) for controlling the image producing apparatus; 31 denotes bank switching means for determining which one of DRAM blocks should be accessed when a plurality of DRAM block sections 42 are used; 32 denotes address converting means for changing the value of the address bus MPUA which has been output from the MPU 30; 33 denotes address decoding means; 34 denotes VBB mode switching means for switching the memory capacity of a video band buffer (hereinafter, referred to as a VBB) which is a part of a memory area of the DRAM block section 42; 35 denotes video data generating means (hereinafter, referred to as a VDG) for producing a video data output signal VDOUT; and 36 denotes a DRAM address generating means for producing a DRAM address (DRAMA) which is sent to the DRAM block section 42. Reference numeral 37 denotes refreshing means for the DRAM. The DRAM access request signal (REFREQ) is outputted at a period of the refresh cycle time of the DRAM. Reference numeral 38 denotes DRAM arbitration means for arbitrating a plurality of access request signals supplied to the DRAM block section 42 and permitting access in response to only one of the access requests. Reference numeral 39 denotes DRAM timing means for producing a timing signal group DRAMT output, which is used to access the DRAM block section 42, and bank signals BANK-0, BANK-1, and BANK-2. Reference numeral 40 denotes bus switching means for switching the data bus MPUD of the MPU to be electrically connected or not. Reference numeral 41 denotes overwriting pattern generating means. The overlaid-writing is a function which has already been explained. Reference numeral 42 denotes the DRAM block section.

An explanation will be made of the operation performed by the above-described block structure of the video data processing section of the image producing apparatus of the embodiment of the present invention. The outline of data processing performed by the block structure of the video data processing section will be first described. Since the data to be printed, which is supplied from the outside, has been stored in a user's data area which is a part of the DRAM block section 42, the data is developed in the form of bit map data by the MPU 30. At this time, if font data is required, a processing such as making reference to a font memory (not shown) may be performed. The bit map data is stored again in a VBB area which is a part of the DRAM block section 42. The data stored in the VBB area is read out by the VDG 35 and the data is converted into serial data and is transmitted to the foregoing LSU in synchronism with the HSYNC signal. A structure for performing the above-mentioned data processing will be described hereinbelow.

An access request to the DRAM block section 42 includes four modes in total. A first mode relates to an access request from the MPU to the VBB area. A second mode relates to an access request from the MPU to a memory area other than the VBB area. A third mode relates to an access request for accessing the VBB area by the VDG 35. A fourth mode relates to a refresh access request for performing refreshing to hold the data in the DRAM of the DRAM block section 42. As mentioned above, there are four modes of access to the DRAM block section 42. Since at least two modes or at most three modes of access requests occur simultaneously, some arbitration is needed. The means for making arbitration is a DRAM arbitration means indicated by 38. It receives four signals such as an access request signal VBBRQ from the MPU to the VBB area, an access request signal MPURQ from the MPU to an area other than the VBB area, an access request signal VDGRQ from the VDG to the VBB area, and an access request signal REFRQ from the refreshing means 37. The DRAM arbitration means 38 performs arbitration therein, permits one of the four access request signals, and outputs a start command signal group STCOM, thereby sending an information as to which one of the access requests is to be executed, to the DRAM timing means 39. The DRAM timing means 39 receives the above signal group STCOM and the output signal BANKST of the bank switching means 31 for making bank switching which is required when a plurality of DRAM block sections 42 are provided. The DRAM timing means 39 generates a timing signal group DRAMT necessary for accessing the DRAM block section 42 and the bank switching signal BANK0, BANK1 and BANK2. On the other hand, the DRAM address generating means 36 decides which one of the address buses should be sent to the DRAM block section 42 in response to the timing signal generated by the DRAM timing means 39. Therefore, the DRAM address generating means 36 has a function such that, when an address switching control output signal group (DAGCOM) of the DRAM timing means 39 are inputted to the DRAM address generating means 36, the DRAM address generating means 36 selects either one of a VBB address bus VBBA, the MPU address bus MPUA, and a VDG address bus VDGA in accordance with the signal group DAGCOM, and connects a selected one of the buses with an address bus DRAMA which has communication with the DRAM block section 42.

The overlaid-writing operation in the VBB area will be described. Although the overlaid-writing in the VBB area is necessary as described with respect to the conventional example, since the DRAM block section 42 in the invention does not have an additional function of the VRAM as is the case with the conventional example, a separate overlaid-writing means is necessary. First, since write data is sent from the MPU 30 to the VBB area through the data bus MPUD, the data is inputted to an A portion of the overwriting pattern generating means 41. On the other hand, the application of a reading timing signal to the DRAM block section 42 is effected by the DRAM timing means 39. The data in the VBB area is inputted to a B portion of the overlaid-writing pattern generating means 41 through a DRAM data bus DRAMD. The input data to the B portion is latched by an output signal OVC of the DRAM timing means 39 and the operation for performing overlaid-writing with the data, which has been inputted to the A portion, is executed. The resultant data is outputted to the data bus DRAMD as data to be written in the VBB area. That is, bit-map-developed data are read out of the memory (read-out image data) and the read-out image data are overlaid-written so as to incorporate another bit-map-developed image data with the read-out image data without destroying the read-out image data, and the overlaid-written image data are stored in the memory. As mentioned above, the data in the VBB area is read out, the operation for performing overlaid-writing with the data, which has been sent from the MPU 30, is executed, and the resultant data is written in the VBB area. Such a method is called a read-modifying writing (RMW), and it is referred to as an RMW cycle hereinbelow. As mentioned above, when seen from the MPU 30, it may be recognized that there occurs only one writing cycle in the VBB area. However, in the actual hardware, the RMW cycle is automatically performed. All those cycles are formed by the DRAM timing means 39.

The VBB mode switching means 34 will be described. As the VBB area will be explained later in detail, when the memory capacity of the VBB area is made variable, or when a plurality of DRAM block sections are used in order to increase the memory capacity of the DRAM block section 42, the location of the VBB area needs to be changed. It is assumed that the memory capacity of the VBB area is changed. As an operation for this purpose, the memory capacity information is inputted from the MPU 30 to the VBB mode switching means 34 through the data bus MPUD. The VBB mode switching means 34 sends the memory capacity information through the VBB data bus VBBD to the respective means, that is, the VDG 35 and the address converting means 32. The VDG 35 receives the memory capacity information and switches the signal pattern which is supplied to the VDG address bus VDGA in accordance with the memory capacity information. On the other hand, as will be explained later, since the VBB area employs a ring buffer system, the address information which is actually outputted from the MPU needs to be converted to the physical address information to be stored in the VBB. Thus, it becomes necessary to switch the address converting means 32 in accordance with the memory capacity information. Further, the bank switching means 31 is used when the location of the VBB area is changed.

Figure 2:
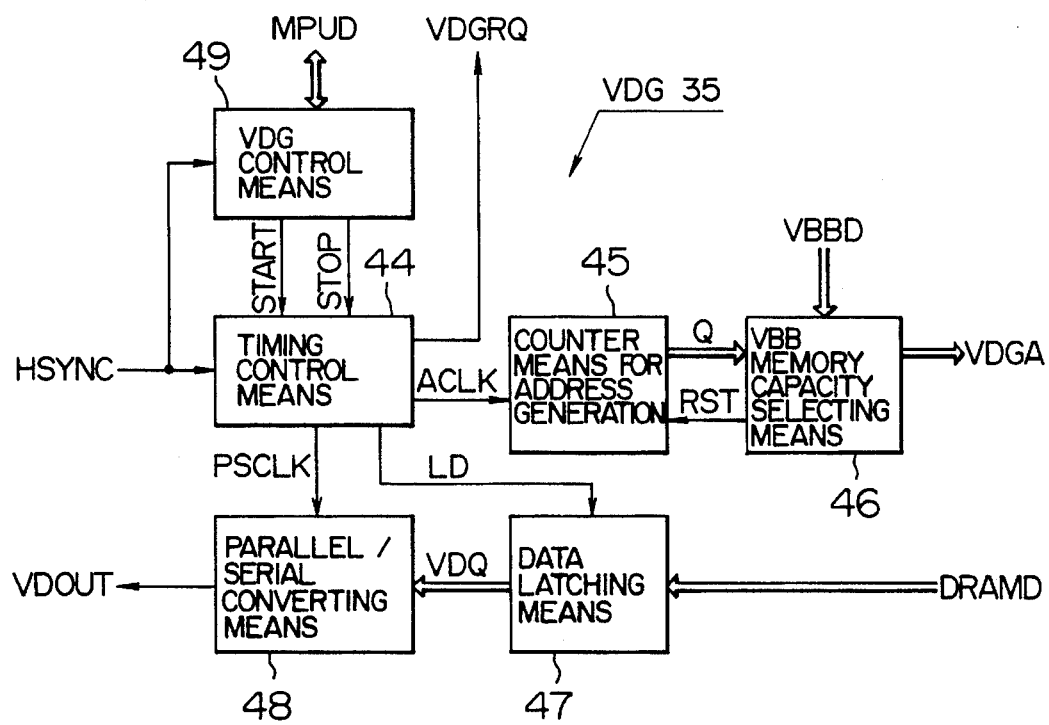
FIG. 2 is a block diagram showing the internal structure of the VDG in FIG. 1.

The VDG 35 will be described further in detail. FIG. 2 is an internal block diagram of the VDG 35. Reference numeral 44 denotes timing control means for synchronizing internal timing of the VDG 35 with an external sync signal HSYNC. Reference numeral 45 denotes counter means which generates an address and counts up by +1 at a time. The output of the counter means 45 is used as an address bus for accessing the VBB area. Reference numeral 46 indicates VBB memory capacity selecting means which inputs the memory capacity information of the VBB area from a VBB bus VBBD, converts it to an address which is used to actually access the VBB area, and outputs the resultant address information to the VDG address bus VDGA. Reference numeral 47 denotes data latching means which latches the data of the VBB area which is inputted through the DRAM data bus DRAMD. Reference numeral 48 denotes parallel/serial converting means which receives the data of the VBB area through a data bus VDQ, converts the inputted data from parallel data to serial data, and outputs the resultant data to the LSU as the video data output signal VDOUT. Reference numeral 49 denotes VDG control means having a function of counting the number of pulses of the external sync signal HSYNC in order to know until which numbered raster the video data output signal VDOUT has been sent out and sending the count value to the MPU 30 through the MPU data bus MPUD. Further, the VDG control means 49 has a further function such that, when an instruction indicating until which numbered raster the video data output signal VDOUT should be outputted, is inputted from the MPU 30 through the MPUD and the output data is sent out from the VDOUT until a raster of the number which is designated by the MPU 30, a stop signal (STOP) for automatically stopping the VDG 35 is sent to the timing control means 44. In addition, the VDG control means 49 also has a starting function of sending a start signal (START) to the timing control means 44.

The operation of the internal block structure of the VDG 35 will be described. The clock synchronized with the external sync signal HSYNC is generated by the timing control means 44, whereby signals PSCLK, LD, ACLK, and VDGRQ are obtained by frequency dividing the above clock. VDGRQ is a request signal which is sent to the DRAM arbitration means 38 so that the VDG 35 is allowed to access the VBB area. When the request signal VDGRQ is permitted by the DRAM arbitration means 38, the data in the VBB area, which is indicated by the address of the address bus VDGA which is outputted from the VDG 35, is read into the VDG 35. On the other hand, the counter means 45 for generating addresses receives the output signal ACLK of the timing control means 44 and increases the count by +1 at a time. An output of the counter means 45 is sent to the VBB memory capacity selecting means 46 through a bus Q. The VBB memory capacity selecting means 46 processes the data from the bus Q in accordance with the memory capacity of the VBB area, which has been inputted from the VBB bus (VBBD), and outputs the resultant data to the VDGA as an actual address information. The content of the above-mentioned process will be described. For instance, the process may be such that, when the memory capacity is small, the upper bit of the data from the bus Q is deleted and only the number of bits, which meet the actual address space, are outputted to the VDG address bus (VDGA). The data of the VBB area, which is indicated by the address of the VDGA which has been outputted as mentioned above, is latched into the data latching means 47 through the DRAM data bus (DRAMD). This parallel data is converted to serial data through the parallel/serial converting means 48 and is sent from the VDOUT as a video data output signal. The flow of signals in the video data processing section has been described above by using FIGS. 1 and 2.

Figure 3:
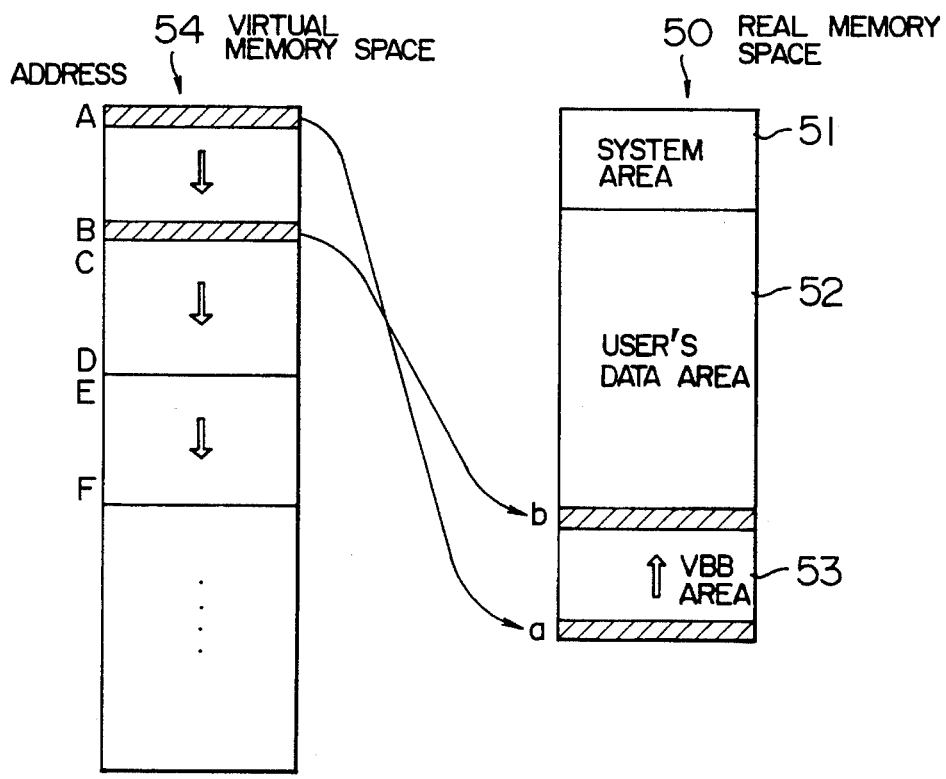
FIG. 3 is a memory map diagram showing a virtual memory space and a real memory space.

Next, the VBB area will be described. FIG. 3 shows a memory map of the DRAM block section 42. Reference numeral 50 denotes a real memory space of the DRAM block section 42. Reference numeral 51 denotes an area which is used by the system; 52 denotes a user's data area for storing the data which has been sent to the image forming apparatus by the user; and 53 denotes a VBB area. Reference numeral 54 denotes a virtual memory space of the VBB area when it is seen from the MPU 30 side. In the memory which has been mapped as mentioned above, the virtual memory space 54 is a location for storing the data outputted from the image forming apparatus which data has been developed in the form of a bit map corresponding to one page of a print paper. When the MPU 30 sequentially writes the bit map data in the virtual memory space 54 from address A to address B, the bit map data is actually sequentially written from address a to address b in the VBB area 53 of the real memory space 50. This data is sequentially read out through the VDG 35 in the order from address a to address b, and this data is converted into serial data and is sent to the laser scan unit (LSU) section. Then, the data, which is written from address C to address D in the virtual memory space 54, is similarly actually written from address a to address b in the VBB area. In order to implement the above-mentioned operation, the VBB area 53 has a structure of a ring buffer. Therefore, the data in the VBB area 53 is sequentially read out and sent to the LSU section through the VDG 35 in the order from address a to address b, from address a to address b, . . . , and so on. On the other hand, when the bit map data is written from the MPU 30 into the virtual memory space 54 in the order from address A to address B, from address C to address D, . . . , the bit map data is actually written in the VBB area 53 in the order from address a to address b, from address a to address b, . . . .

Figure 4:
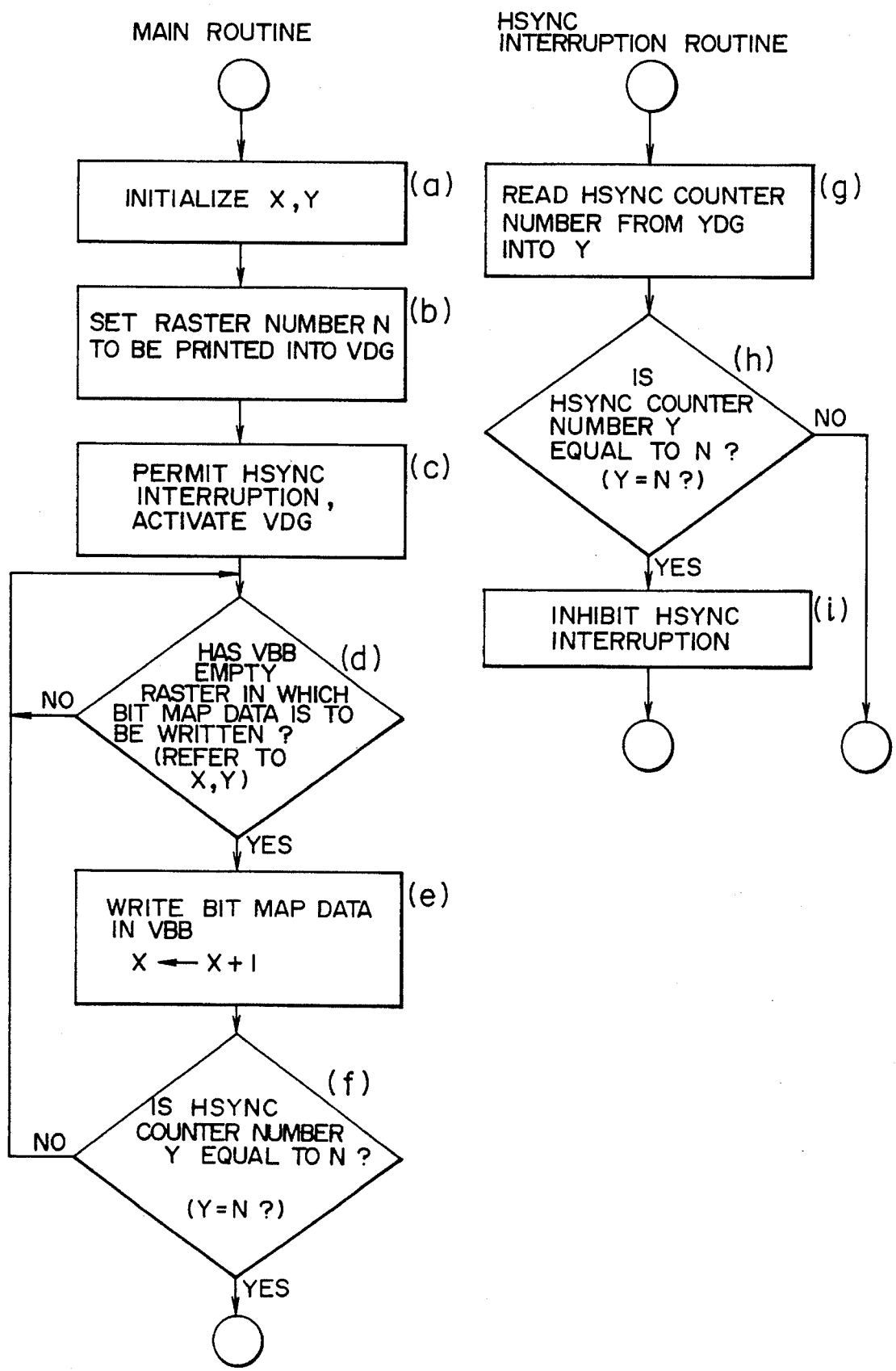
FIG. 4 is a flowchart illustrating a control procedure of the main control routine for the image producing apparatus of the embodiment of the present invention shown in FIG. 1.

The control performed by the MPU 30 in the embodiment will be described by using a flowchart of FIG. 4. As regards the HSYNC interruption routine, when considering from a standpoint of a hardware, the interruption to the MPU 30 occurs each time a pulse is inputted to the HSYNC, as the external sync signal HSYNC in FIG. 1 is inputted to an interruption terminal of the MPU 30. This means that the interruption occurs at every raster. The flowchart will be explained hereinbelow. First, in the main routine, in step (a), the variables X and Y are initialized. X denotes the raster number which is written in the VBB area by the MPU 30. Y denotes the count number indicative of the number of interruption times caused by every HSYNC. In step (b), the raster number N to be printed is set in the VDG. In step (c), the HSYNC interruption is permitted, thereby activating the VDG. In step (d), by making reference to X and Y, a check is made to determine whether an empty raster adapted to write-bit map data in the VBB exists or not. If no empty raster exists, the processing routine is returned to the entrance of step (d). If an empty raster exists, the processing proceeds to step (e). In step (e), the bit map data is written in the VBB by an amount of one raster, and "1" is added to the value of X. In step (f), a check is made to determine whether or not the HSYNC count number Y is equal to the raster number N to be printed. If Y≠N, the processing is returned to the entrance of step (d). If Y=N, the writing of the bit map data in the VBB is completed. Next, in the HSYNC interruption routine, in step (g), the HSYNC count number is read out from the VDG and stored in Y. In step (h), Y and N are compared with other to determine whether the printing is completed or not. If Y=N, the processing proceeds to step (i). If Y ≠N, the processing is completed. In step (i), the HSYNC interruption is inhibited. The operation of the block structure of the video data processing section shown in FIG. 1 has been described hereinabove by making reference to FIGS. 2, 3, and 4.

Figure 5:
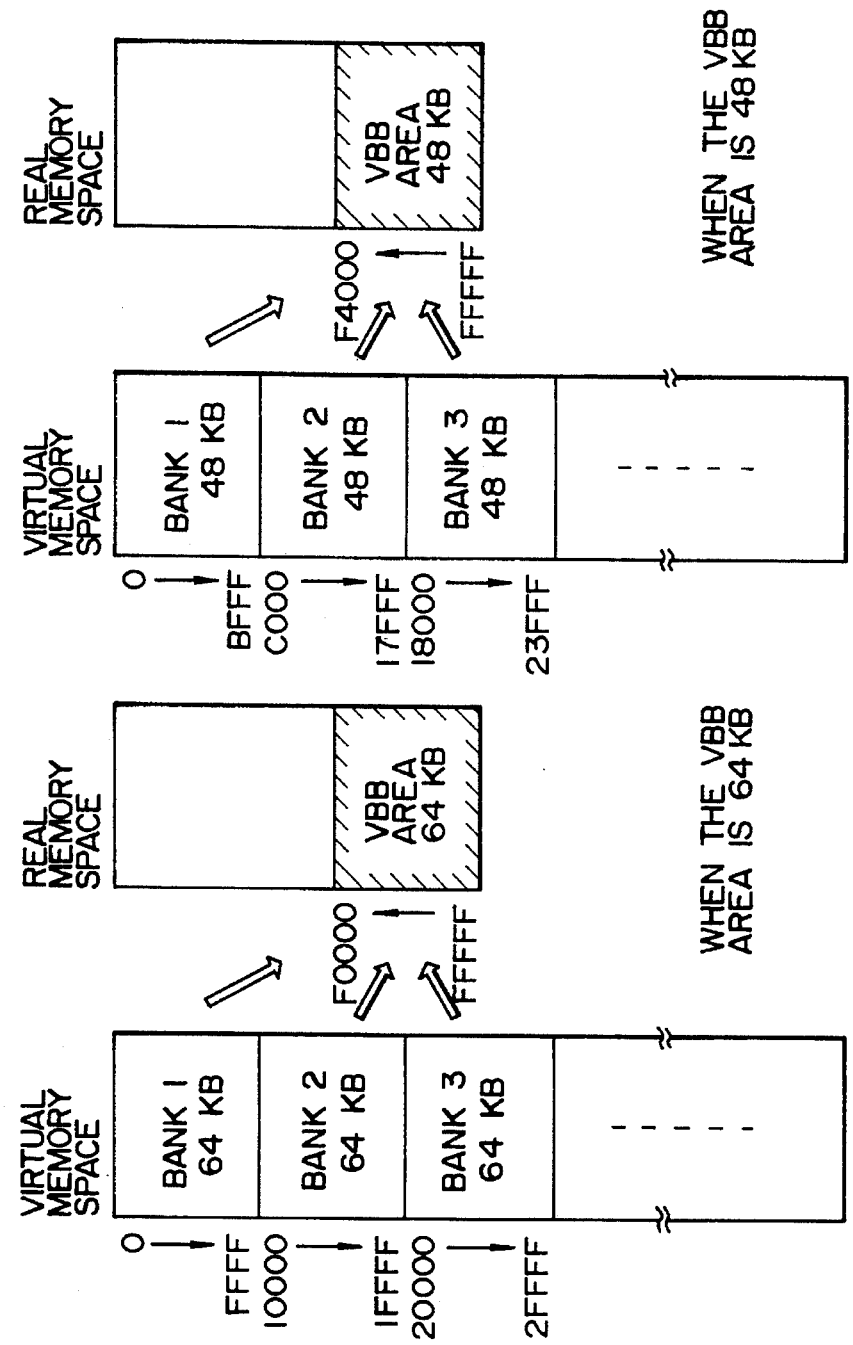
FIG. 5 is a memory map diagram when the VBB area is made variable.

Next, the case of making the VBB area have a variable capacity will now be described by making reference to FIG. 5. When the capacity of the VBB area is 64 kB, the addresses of the virtual memory space corresponding to addresses FFFFF (H) to F0000 (H) of the real memory space are easily converted to the addresses of the real memory space, by ignoring upper bits of the addresses of the virtual memory space and making only lower four digits of the hexadecimal number significant, since, in the addresses of the virtual memory space, the bank 1 has addresses 0 to FFFF (H), the bank 2 has addresses 10000 (H) to 1FFFF (H), the bank 3 has addresses 20000 (H) to 2FFFF (H), .... Next, when the capacity of the VBB area is 48 kB, in the addresses of the virtual memory space corresponding to addresses FFFFF (H) to F4000 (H) of the real memory space, the bank 1 has addresses 0 to BFFF (H), the bank 2 has addresses C000 (H) to 17FFF (H), and the bank 3 has addresses 18000 (H) to 23FFF (H). Accordingly, the address conversion from the virtual memory to the real memory can not be performed so easily as done in the case of 64 kB. The address conversion is executed generally in the following manner.

$$Ap = INV(Al - Bp \times INT(Al/Bp)) \qquad (1)$$

where, Ap denotes an address (physical address) of the real memory space; Al denotes an address (logic address) of the virtual memory space; Bp indicates a memory capacity of the VBB area; and INV(X) means that 1 and 0 are reversed when X is expressed in terms of a binary number. Further, INT(X) indicates an integer portion of X. As shown in the equation (1), the converting means for converting to logic addresses can be generally realized if only a multiplier/ divider and adder/subtracter are available. As in the above-mentioned case of 64 kB, when the VBB memory capacity has a value equal to the n-th power of 2 (where n is an integer), it is sufficient to ignore upper bits and to use only a necessary number of bits, and hence the converting means can be easily realized.

As described above, in order to make the capacity of the VBB area variable, the address converting means 32 shown in FIG. 1 is used, and the internal structure of the address converting means 32 is made to satisfy the function of the equation (1).

Figure 6:
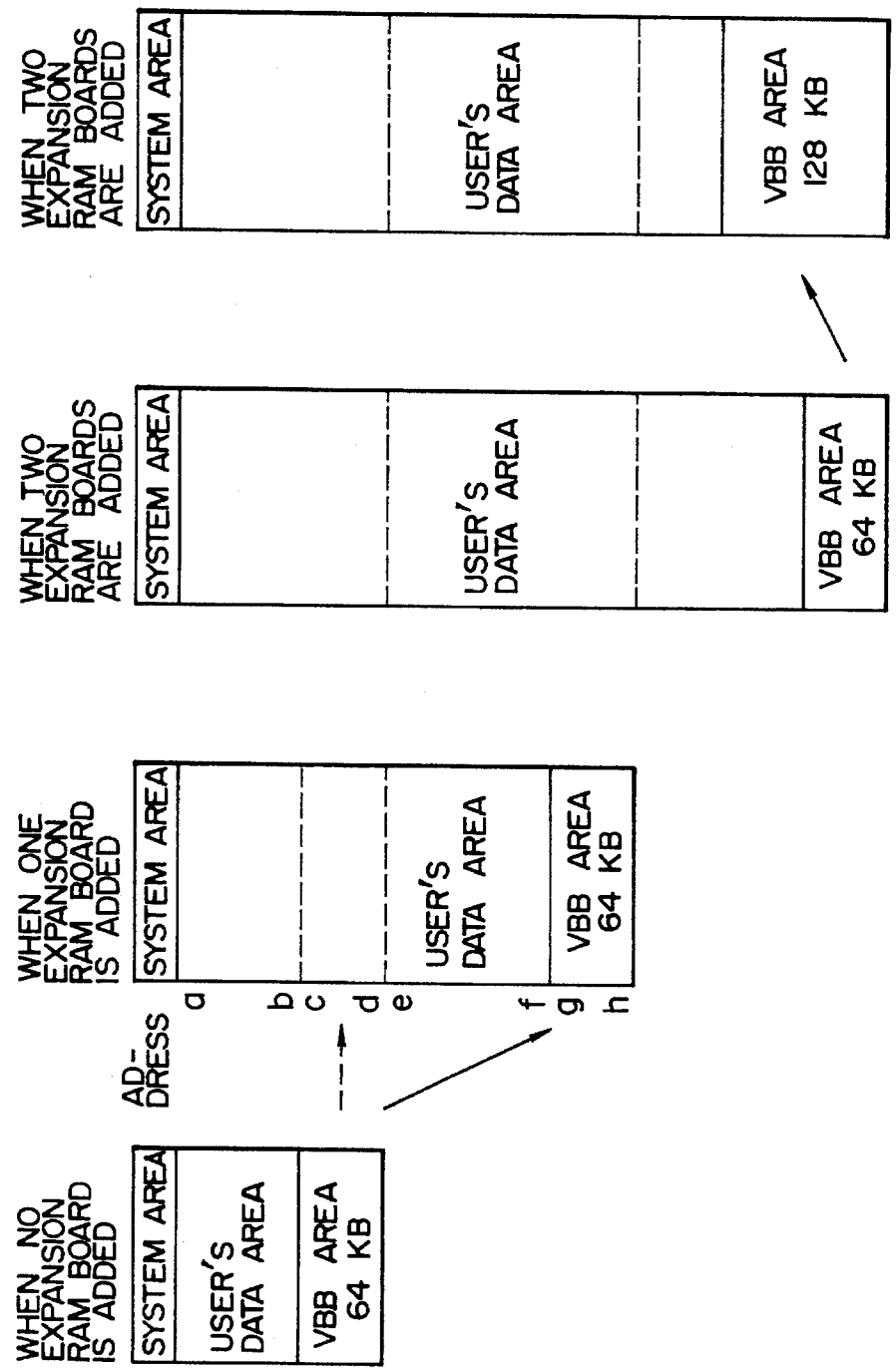
FIG. 6 is a memory map diagram when expanding the DRAM block section.
Figure 7:
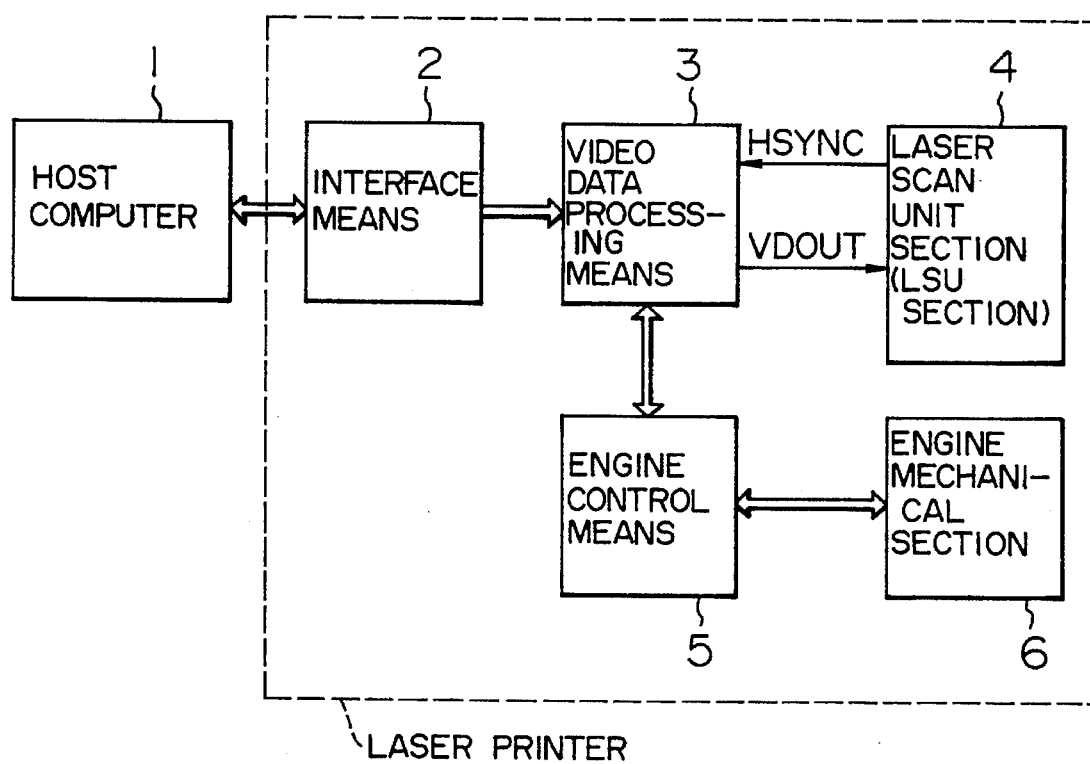
FIG. 7 is a block structure diagram showing a conventional laser printer.
Figure 8:
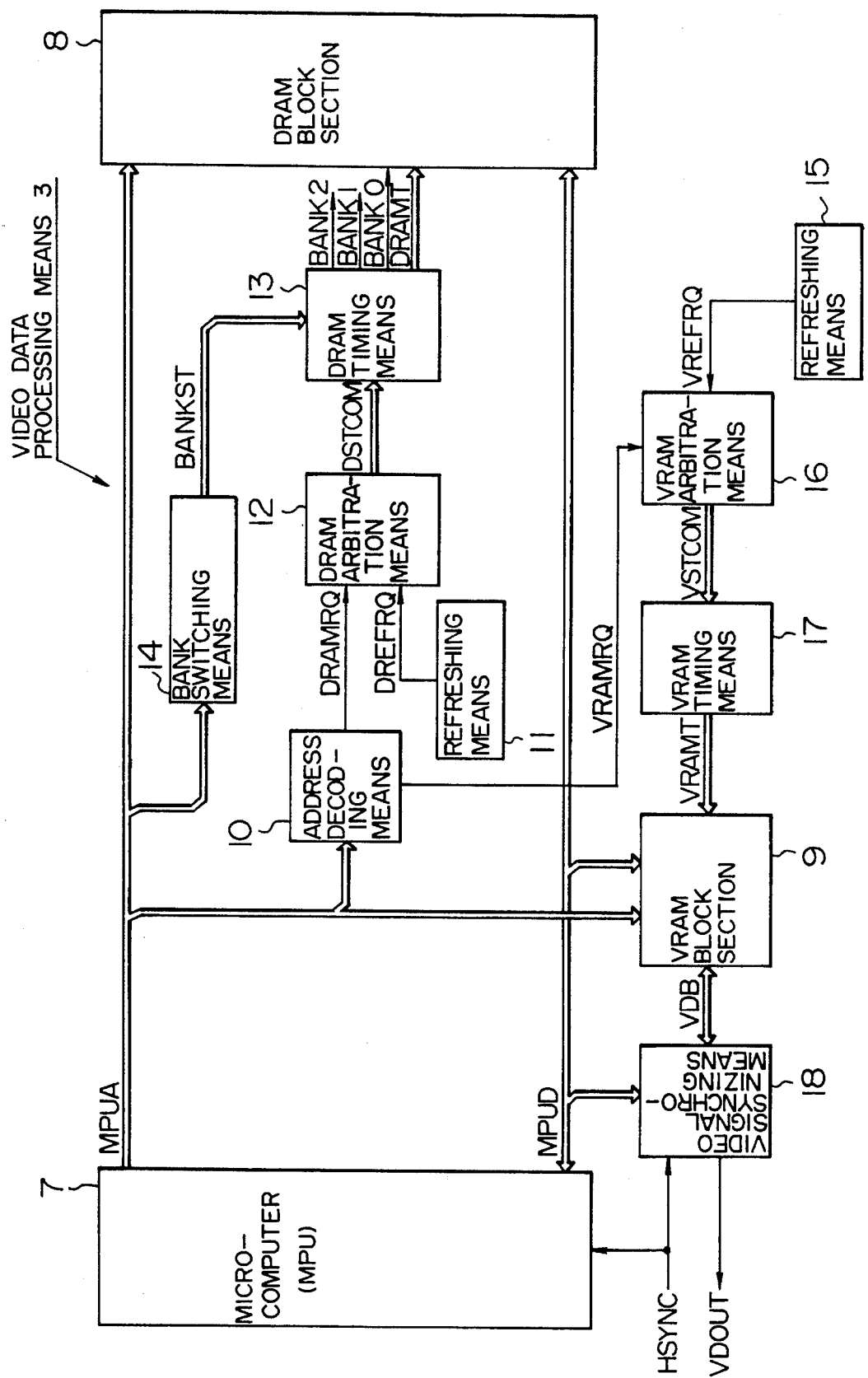
FIG. 8 is a block structure diagram showing a conventional video data processing section.
Figure 9:
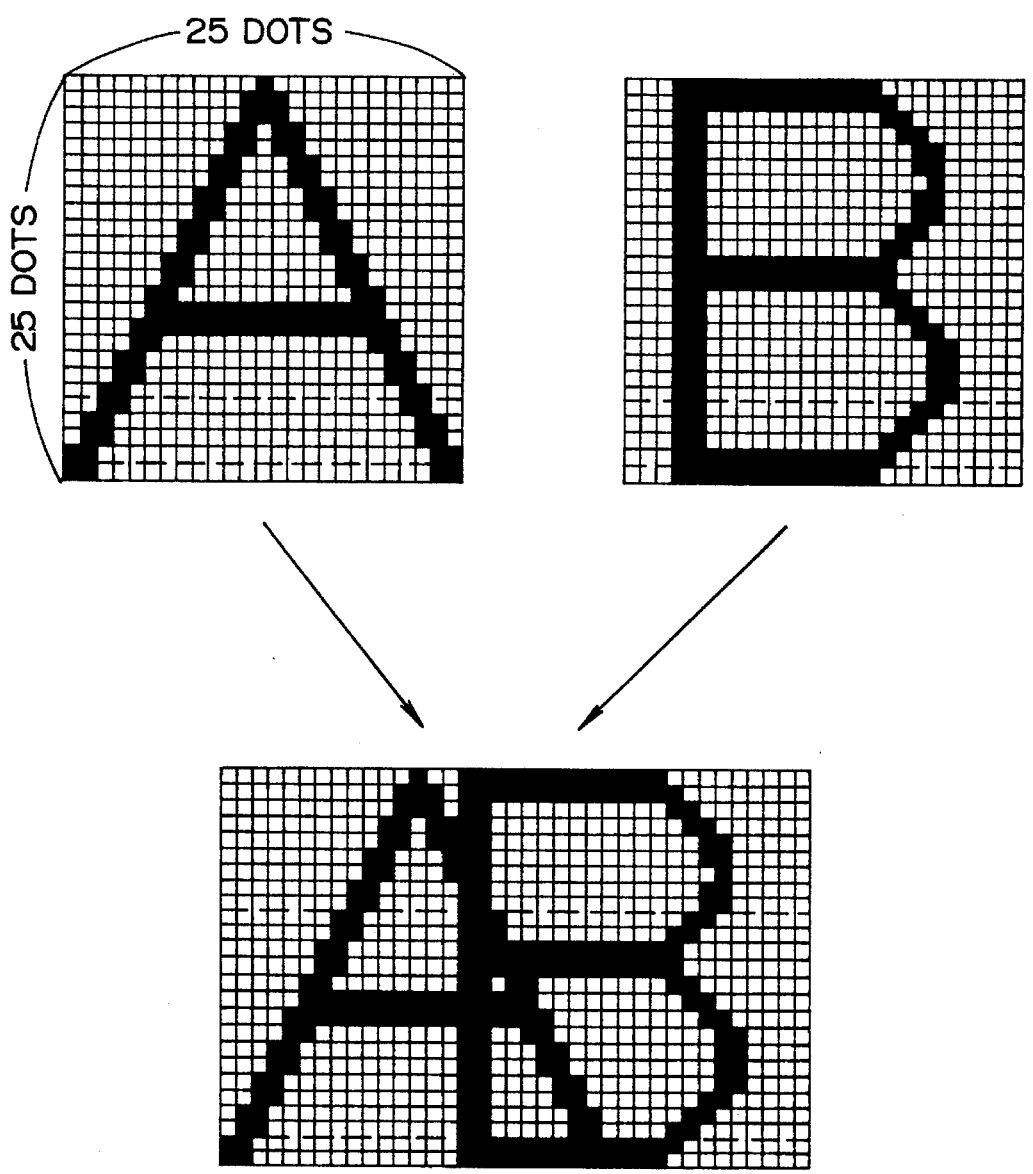
FIG. 9 is a bit map data development diagram for explaining the operation of overwriting.
Figure 10:
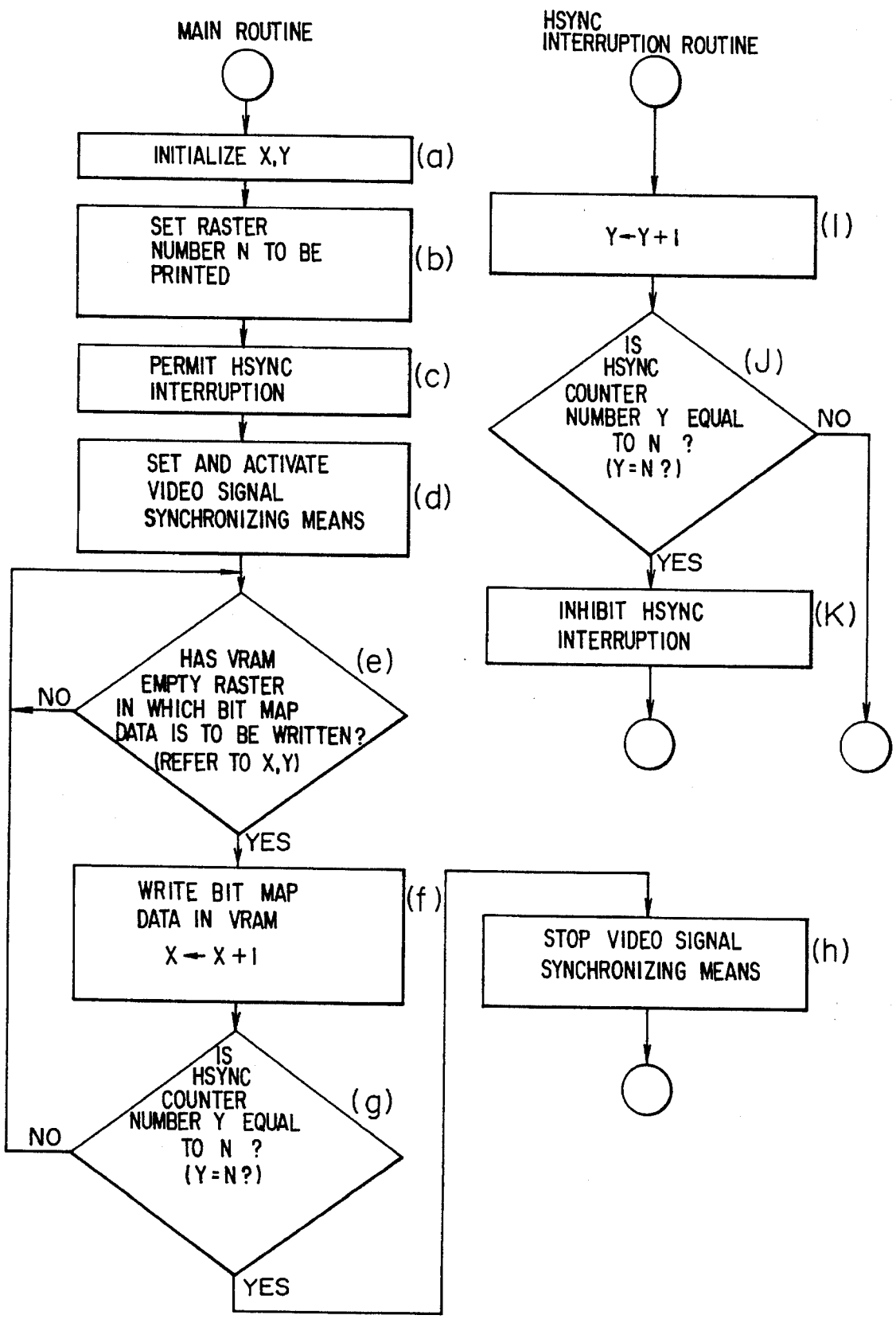
FIG. 10 is a flowchart showing a conventional control procedure.

FIG. 6 shows a memory map when expanding the memory capacity of the DRAM block section 42. FIG. 6 shows an example of a construction in which only the DRAM block section 42 is constructed as a separate printed board (hereinafter, referred to as an expansion RAM board) and the memory capacity can be expanded in accordance with the user's desire. In the left half portion of FIG. 6, there are shown two cases using a KBB area of 64 KB in one of which cases no expansion RAM board is provided and in the other of which cases one expansion RAM board is added. In the diagram, addresses e to h show an expanded portion. When the DRAM block section 42 includes one expansion RAM board added thereto, if the DRAM block section 42 includes a VBB area of fixed mapping, such a VBB area is arranged within addresses c to d as shown in the diagram. Therefore, since the user's data area is divided into two address portions a to b and e to f, a continuous user's data area cannot be retained and the data processing becomes complicated. Such problem may be solved by a method mapping the VBB area at the last position in the memory, namely, in address g to h, as shown in the diagram. Generally, even if the memory capacity is expanded, since it is often the case that all the effective bits of the last address are 1, the means for producing an address which is generated by the VDG 35, shown in FIG. 1, can be used in common, and therefore the hardware can be easily realized. On the other hand, another method of retaining a continuous user's data area is to map the VBB area adjacent to the system area. However, in this case, if the capacity of the system area is changed in association with the revision of the system, the hardware of the VDG 35 has to be changed, so that such a method is remarkably inconvenient. For the above reasons, in this embodiment, the VBB area is mapped at the last position in the memory which is actually packaged. In the right half portion of FIG. 6, there are shown two cases using KBB areas of 64 KB and 128 KB, respectively, in both of which cases two expansion RAM boards are added. As shown in the diagram, since the VBB area is made variable, a continuous user's data area can be easily retained, and also it can be easily managed. Further, the VBB area capacity can be optimized in accordance with an amount of the user's data which is inputted from the outside, and the system, which is also strong against the overrun such as explained by referring to the conventional example, can be constructed. That is, it will be understood that the VBB memory capacity may be determined to assure a maximum memory capacity for a VBB area by using an empty area other than the user's data area, in which the user's data is actually stored, and the VBB memory capacity may be set in the VBB mode switching means shown in FIG. 1. On the other hand, a check is made to determine whether sufficient VBB area can be assured or not, and, if it can be assured, the memory capacity covering one page can be fixed as a VBB area. In this case, the overrun never occurs. In FIG. 6, there are shown three cases including the case where no expansion RAM board is added, the case where one expansion RAM board is added, and the case where two expansion RAM boards are added. In order to arrange the VBB area at the last position, suitable setting therefor may be made in the bank switching means 31 shown in FIG. 1. The explanation of the present invention has been made being centered on the VBB area.

As mentioned above, according to the present invention, the system memory area and the image memory area are provided in the memory means, and the image memory area is made variable. Therefore, it is possible to provide an image producing apparatus in which, when the necessary capacity of the system memory area is large, the image memory area is made small, while, when the necessary capacity of the system memory area is small, the image memory area is made large, whereby the utilization efficiency of the memory means can be remarkably improved.

We claim:

1. A printing image data producing apparatus for bit-map-developing input image data, converting and outputting resultant binary image data for printing on a print medium, said apparatus comprising:

bit image developing means for bit-map-developing input image data to obtain binary image data, said binary image data being coincident with and representing pixels of an output image;

dynamic memory means including a first memory area for storing said input image data before the input image data are bit-map-developed and a second memory area for storing image data obtained by bit-map-developing said input image data into a pattern which is coincident with and represents said pixels of said output image, said first memory area and said second memory area being arranged within a continuous memory space in said dynamic memory means and said second memory area having a storage capacity capable of storing only a part of a full page of said binary image data to be printed on a full page of said print medium;

overlaid-writing means for reading out the binary image data from said second memory area of said dynamic memory means, overlaid-writing another bit-map-developed image data on the read-out image data without destroying the read-out image data, and storing the overlaid-written image data again in said second memory area of said dynamic memory means; and output means for reading out the binary image data stored in said second memory area in synchronism with a sync signal externally supplied thereto, converting read-out binary image data into serial data, and outputting said serial data sequentially for being supplied to a printer for printing on said print medium, wherein said bit image developing means is controlled to bit-map-develop said input image data and to store resultant bit-map-developed binary image data in said second memory area after said output means has read out binary image data previously stored in said second memory area, so as to prevent an overrun from being caused by a difference in operational speed between said bit image developing means and said output means.

2. An image data producing apparatus according to claim 1, further comprising memory area setting means for ensuring that said second memory area is located in an address area of said dynamic memory means that is separate from said first memory area of said dynamic memory means.

3. An image producing apparatus according to claim 1, wherein said sync signal is a horizontal sync signal.

4. An image producing apparatus according to claim 3, wherein said horizontal sync signal is supplied by a laser scan unit section of a laser printer and said output means outputs said serial data to said laser scan unit section.

5. A printing image data producing apparatus for bit-map-developing input image data, converting and outputting resultant binary image data for printing on a print medium, said apparatus comprising:

bit image developing means for bit-map-developing input image data to obtain binary image data, said binary image data being coincident with and representing pixels of an output image;

dynamic memory means including a first memory area for storing the input image data before the input image data are bit-map-developed and a second memory area for storing image data obtained by bit-map-developing said input image data into a pattern which is coincident with said pixels of said output image, said first memory area and said second memory area being arranged within a continuous memory space in said dynamic memory means and said second memory area having a storage capacity capable of storing only a part of a full page of said binary image data to be printed on a full page of said print medium;

control means for controlling a storage capacity of each of said second memory area and said first memory area to alter a relative storage capacity proportion therebetween and for relocating said second memory area when a storage capacity of said dynamic memory means is expanded, thereby providing (i) an appropriate storage capacity proportion between said second memory area and said first memory area and (ii) a maximum available storage capacity of said second memory area;

overlaid-writing means for reading out the binary image data from said second memory area of said dynamic memory means, overlaid writing another bit-map-developed image data on the read-out image data without destroying the read-out image data, and storing the overlaid-written image data again in said second memory area of said dynamic memory means; and output means for reading out the binary image data stored in said second memory area in synchronism with a sync signal externally supplied thereto, converting said read-out binary image data into serial data, and outputting said serial data sequentially for being supplied to a printer for printing on said print medium, wherein said control means controls said bit image developing means to bit-map-develop said input image data and to store resultant bit-map-developed binary image data in said second memory area after said output means has read out binary image data previously stored in said second memory area, whereby said control means functions to prevent an overrun from being caused by a difference in operational speed between said bit image developing means and said output means.

6. An image data producing apparatus according to claim 5, wherein said control means calculates a maximum available storage capacity of said second memory area in accordance with an amount of said data to be stored in said first memory area.

7. An image producing apparatus according to claim 5, wherein said sync signal is a horizontal sync signal.

8. An image producing apparatus according to claim 7, wherein said horizontal sync signal is supplied by a laser scan unit section of a laser printer and said output means outputs said serial data to said laser scan unit section.

9. A printing image data producing apparatus for bit-map-developing input image data, converting and outputting resultant binary image data for printing on a print medium, said apparatus comprising:

bit image developing means for bit-map-developing input image data to obtain binary image data, said binary image data being coincident with and representing pixels of an output image;

dynamic memory means comprising an image memory area of variable storage capacity, said image memory area storing bit-map-developed binary image data obtained by bit-map-developing said input image data into a pattern which is coincident with and represents said pixels of said output image, said image memory area having a storage capacity capable of storing only a part of a full page of said binary image data to be printed on a full page of said print medium;

data access means for accessing said image memory area;

overlaid-writing means for reading out the binary image data from said image memory area of said dynamic memory means, overlaid-writing another bit-map-developed image data on the read-out image data without destroying the read-out image data and storing the overlaid-written image data again in said image memory area of said dynamic memory means; and output means for reading out the binary image data stored in said image memory area in synchronism with a sync signal externally supplied thereto, converting said read-out binary image data into serial data, and outputting said serial data sequentially for being supplied to a printer for printing on said print medium, wherein said bit image developing means is controlled to bit-map-develop said input image data and to store resultant bit-map-developed binary image data in said image memory area after said output means has read out binary image data previously stored in said image memory area, so as to prevent an overrun from being caused by a difference in operational speed between said bit image developing means and said output means.

10. An image producing apparatus according to claim 9, wherein said sync signal is a horizontal sync signal.

11. An image producing apparatus according to claim 10, wherein said horizontal sync signal is supplied by a laser scan unit section of a laser printer and said output means outputs said serial data to said laser scan unit section.

\* \* \* \* \*